United States Patent [19]
Ooi et al.

[11] Patent Number: 5,245,449
[45] Date of Patent: Sep. 14, 1993

[54] POLYMER DISPERSED LIQUID CRYSTAL COLOR PROJECTION DISPLAY APPARATUS

[75] Inventors: Yoshiharu Ooi; Tomoki Gunjima, both of Yokohama, Japan

[73] Assignee: Asahi Glass Company Ltd., Tokyo, Japan

[21] Appl. No.: 574,811

[22] Filed: Aug. 30, 1990

[30] Foreign Application Priority Data

Aug. 31, 1989 [JP] Japan .................... 1-223057
Sep. 7, 1989 [JP] Japan .................... 1-230422

[51] Int. Cl.⁵ .................... G02F 1/133; H04N 9/31
[52] U.S. Cl. .................... 359/40; 359/51; 359/67; 359/71; 359/634; 353/31; 353/34
[58] Field of Search .................... 350/331 R, 333, 334, 350/339 F, 337, 338, 345, 346, 347 V, 172, 166, 174, 356; 353/31, 34, 37, 122; 358/60, 61, 236

[56] References Cited

U.S. PATENT DOCUMENTS

| 4,191,456 | 3/1980 | Hong et al. ............ | 353/34 |
| 4,435,047 | 3/1984 | Fergason ............ | 350/334 |
| 4,552,441 | 11/1985 | Dewey ............ | 353/31 |
| 4,613,207 | 9/1986 | Fergason ............ | 350/334 |
| 4,688,900 | 8/1987 | Doane et al. ............ | 350/347 V |
| 4,693,557 | 9/1987 | Fergason ............ | 350/334 |
| 4,715,684 | 12/1987 | Gagnon ............ | 359/40 |
| 4,749,259 | 6/1988 | Ledebuhr ............ | 350/337 |
| 4,818,070 | 4/1989 | Gunjima et al. ............ | 350/347 V |
| 4,850,685 | 7/1989 | Kamakura et al. ............ | 353/31 |
| 4,864,390 | 9/1989 | McKechie et al. ............ | 350/345 |
| 4,904,061 | 2/1990 | Aruga ............ | 350/345 |
| 4,913,529 | 4/1990 | Goldenberg et al. ............ | 350/337 |
| 4,936,658 | 6/1990 | Tanaka et al. ............ | 350/345 |
| 4,969,732 | 11/1990 | Wright et al. ............ | 353/122 |
| 5,022,750 | 6/1991 | Flasck ............ | 359/41 |
| 5,029,986 | 7/1991 | De Vaan ............ | 359/68 |
| 5,040,877 | 8/1991 | Blinc et al. ............ | 359/84 |
| 5,060,058 | 10/1991 | Goldenberg et al. ............ | 359/41 |
| 5,150,232 | 9/1992 | Gunkima et al. ............ | 359/51 |

OTHER PUBLICATIONS

Patent Abstracts of Japan, vol. 13, No. 146(P854), Apr. 11, 1989, & JP-A-63-309917, Dec. 19, 1988, F. Yajima, "Projection Type Color Display Device".
Patent Abstracts of Japan, vol. 12, No. 328(E654), Sep. 6, 1988, & JP-A-63-92190, Apr. 22, 1988, T. Atsuta, et al., "Color Television Picture Projector".
Thin-Film Optical Filters, Second edition, H. A. Macleod, Adam Hilgher Ltd, Bristol, pp. 1–26.
Optical Thin Films—User's Handbook, James D. Rancourt, Macmillan Publishing Company.

Primary Examiner—John S. Heyman
Assistant Examiner—Tai V. Duong
Attorney, Agent, or Firm—Oblon, Spivak, McClelland, Maier & Neustadt

[57] ABSTRACT

A liquid crystal color projection display apparatus having a projection light source, a plurality of liquid crystal display elements for separately modulating lights of a plurality of colors from the projection light source and an optical projection system for projecting light to a projection screen, wherein a liquid crystal and polymer composite put between a pair of substrates each equipped with an electrode is used as the liquid crystal display element, in which a liquid crystal material is dispersed and held in a polymer matrix and the refractive index of the polymer matrix substantially agrees with the ordinary light refractive index ($n_o$) of the liquid crystal material used, a dichroic mirror is used for color splitting or color synthesis and the dependence of dichroic mirror's spectral characteristics upon the state of polarization is decreased. Clear color images of high purity and excellent hue can be obtained. Size and the cost of the liquid crystal display apparatus can be reduced.

15 Claims, 6 Drawing Sheets

FIGURE 9A
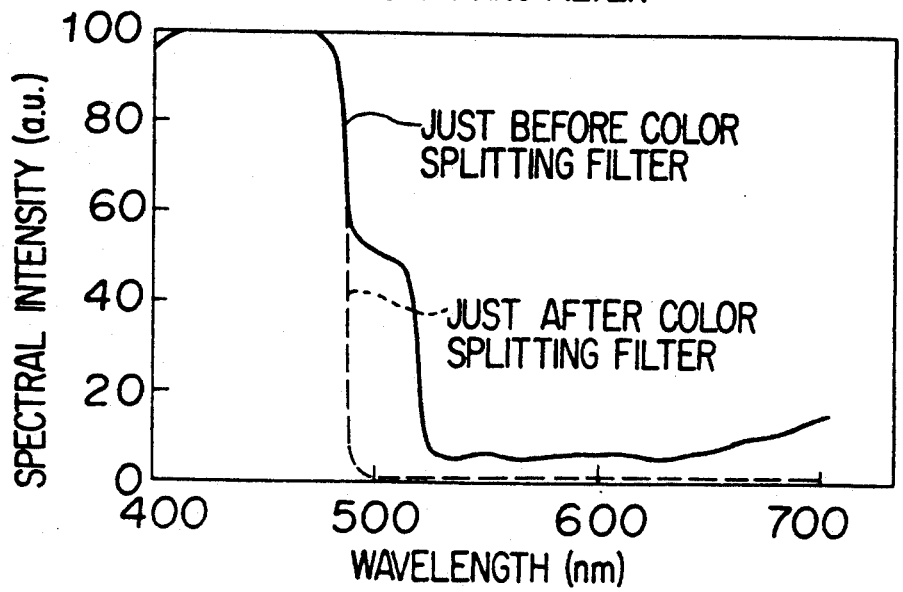
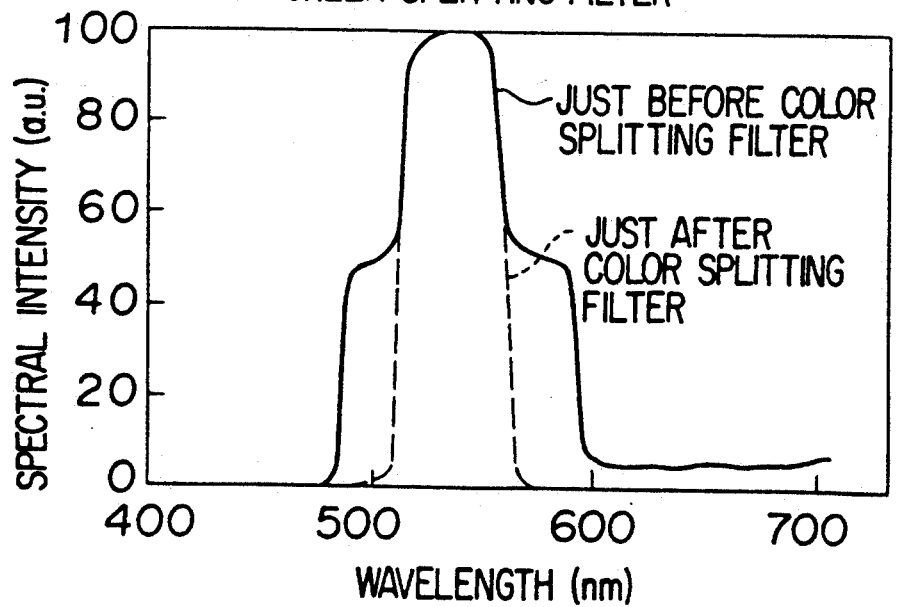
FIGURE 9B

POLYMER DISPERSED LIQUID CRYSTAL COLOR PROJECTION DISPLAY APPARATUS

The present invention concerns a liquid crystal color projection display apparatus.

BACKGROUND OF THE INVENTION

A liquid crystal projection display apparatus using transparent type liquid crystal display elements have been noted in recent years as a substitute for projection type display apparatus using CRT. In particular, a liquid crystal color projection display apparatus using lights of three colors i.e., R, G and B, transmitting and modulating them separately into three liquid crystal display elements and then projecting them on a projection screen can provide color images over a large area and at high quality and, accordingly, vigorous development has now been undertaken for them.

Among such liquid crystal projection display apparatuses, those using TN (twisted nematic) type liquid crystal having advantageous feature of consuming less electric power and operating at low driving voltage are used predominantly.

FIG. 2 and FIG. 3 show examples of constitutions for liquid crystal color projection display apparatus using TN liquid crystal display elements or transparent-scattering type liquid crystal elements and dichroic mirrors.

FIG. 2 is an example of using dichroic prisms 12A, and 12B, each of which is a specific form of a dichroic mirror, for splitting and synthesizing color and they are so adapted that the incident angle $\theta$ of light is set as: $\theta = 45°$ in both of color splitting and color synthesis.

FIG. 3 shows another example of using dichroic mirrors 22A, 22B, 22C and 22D for color split and color synthesis, in which they are so adapted that the incident angle $\theta$ of light is set to: $\theta = 45°$ in both of color split and color synthesis.

In the figures, there are shown projection light sources 11 and 21, mirrors 13A, 13B, 13C, 13D, 23A and 23B, transparent-scattering type liquid crystal display elements (or TN liquid crystal display elements) 14A, 14B, 14C, 24A, 24B and 24C, optical projection systems 15 and 25 and projection screens 17 and 27.

Since two polarization plates are required in the TN type liquid crystal display element, it involves a problem that the light transmittance is low and the projected image is dark.

In particular, an extremely strong light source is required for projecting images and this leads to a problem that high contrast is difficult to be attained on the projection screen or heat generated from the light source gives an undesired effect on the liquid crystal display elements.

In view of the above, for overcoming the problems of the TN type liquid crystal display element, a transparent-scattering type liquid crystal display element using a liquid crystal and polymer composite has been proposed, in which a liquid crystal material is dispersed and held in a polymer matrix, the refractive index of the liquid crystal material changes depending on the state of voltage application to alternately provide a light transmission state and a light scattering state in accordance with agreement and disagreement of the refractive index between the liquid crystal material and the polymer matrix. The transparent-scattering type liquid crystal display element utilizes such light transparent-scattering properties.

In the transparent-scattering type liquid crystal display element using the liquid crystal and polymer composite based on the operation principle for the agreement of the refractive indices, two polarization plates are not required as in the TN type liquid crystal display element and the light emitted from the projection light source under random polarization can be used directly as the incident light. Accordingly, in the transparent-scattering type liquid crystal display element, a transmission image which is twice as bright as that of the TN type liquid crystal display element can be obtained even when an identical optical source is used.

However, if such transparent-scattering type liquid crystal display element is used, instead of the conventional TN type liquid crystal display element, to the liquid crystal color projection display apparatus as shown in FIGS. 2 and 3, it results in a drawback that the spectral characteristics are deteriorated in the optical system for color splitting or color synthesis, and the hue of the projected images is poor as compared with that of the liquid crystal color projection display apparatus using the TN type liquid crystal display element.

This is due to the use of dichroic mirrors or dichroic prisms for the color split means and the color synthesis means in the liquid crystal color projection display apparatus. That is, when white light emitted from a light source of white color is passed through color split means comprising dichroic mirrors or dichroic prisms, a plurality of split lights of different colors can be obtained. On the other hand, when a plurality of thus split lights are passed through the color synthesis means comprising the dichroic mirror or dichroic prism, lights synthesized from them can be obtained.

The dichroic mirror or dichroic prism has a structure in which transparent dielectric films each of different refractive index are laminated, each at a film thickness substantially corresponding to the light wavelength, on a transparent sheet or the surface of a prism, and it has a function of spectralizing light into that in a high transmission wavelength region and that in a high reflection wavelength region with respect to an optical wavelength depending on the structure of the multi-layered film by the optical multi-interference effect. It has been known that such an optical multi-layered film shows remarkable difference in the spectral characteristics corresponding to P polarization and S polarization relative to the surface formed with the multi-layered films along with the increase of the light incident angle $\theta$ from zero. FIGS. 5 and 6 show one example of the dependence of the spectral characteristics on the state of polarization of the dichroic mirror and the dichroic prism.

In the case of the liquid crystal color projection display apparatus using the TN type liquid crystal display element, since the polarization plates are used, only one of P polarization or S polarization is utilized by disposing the plates such that the polarization axis corresponds to only one of the polarizations. Accordingly, even if the polarization dependency of the spectral characteristics is formed as shown in FIGS. 5 and 6, sharp color splitting characteristics can be obtained and a projected image with satisfactory hue can be obtained.

On the other hand, since incident light is put under random polarization in the case of using the transparent-scattering type liquid crystal display element, the dichroic mirror or the dichroic prism shows a spectralizing effect corresponding to the mean value between the P polarization and the S polarization in the spectral characteristics. Accordingly, since the color splitting characteristics are as shown by dotted lines in FIGS. 5 and 6, in which the color purity is reduced. Therefore, the hue of the projection image after color synthesis is poor as compared with that in the liquid crystal color projection display apparatus using the TN type liquid crystal display element.

SUMMARY OF THE INVENTION

The present invention has been accomplished with an aim of overcoming the foregoing problems in the prior art and the object thereof can be attained by the liquid crystal color projection display apparatus of the present invention as described below.

In accordance with the present invention, there is provided a liquid crystal color projection display apparatus having a projection light source, a plurality of liquid crystal display elements for separately modulating lights of a plurality of colors from the projection light source and an optical projection system for projecting light to a projection screen, wherein a liquid crystal and polymer composite but between a pair of substrates provided with electrodes is used as the liquid crystal display element, in which a liquid crystal material is dispersed and held in a polymer matrix and the refractive index of the polymer matrix substantially agrees with the ordinary refractive index ($n_o$) of the liquid crystal material used, a dichroic mirror is used for color splitting or color synthesis and the dependence of dichroic mirror's spectral characteristics upon the state of polarization is decreased.

Further, in accordance with the present invention, there is provided a liquid crystal color projection display apparatus having a projection light source, a plurality of liquid crystal display elements for separately modulating lights of a plurality of color from the projection light source and an optical projection system for projecting light to a projection screen, wherein a liquid crystal and polymer composite put between a pair of substrates provided with electrodes is used as the liquid crystal display element, in which a liquid crystal material is dispersed and held in a polymer matrix, the refractive index of the polymer matrix changes in accordance with the state of voltage application, light is transmitted when the refractive index of the polymer matrix substantially agrees with the refractive index of the liquid crystal material used and light is scattered when they do not substantially agree with each other, a dichroic mirror is used for color splitting and color synthesis and the incident angle $\theta$ of light to at least one of the dichroic mirrors satisfies a relationship: $10° < \theta < 40°$.

Further, in accordance with the present invention, there is provided a liquid crystal color projection display apparatus having a projection light source, a plurality of liquid crystal display elements for separately modulating lights of a plurality of colors from the projection light source and an optical projection system for projecting light to a projection screen, wherein a liquid crystal and polymer composite put between a pair of substrates provided with electrodes is used as the liquid crystal display element, in which a liquid crystal material is dispersed and held in a polymer matrix and the refractive index of the polymer matrix changes in accordance with the state of voltage application, light is transmitted when the refractive index of the polymer matrix substantially agrees with the refractive index of the liquid crystal material used and light is scattered when they do not agree with each other, a dichroic mirror is used for color splitting and color synthesis and a color split filter is disposed in the optical path for each of colors.

In the liquid crystal color projection display apparatus according to the present invention, since a transparent-scattering type liquid crystal display element comprising a liquid crystal and polymer composite capable of electrically controlling the light scattering state and the light transmission state is used instead of the TN type liquid crystal display element, polarization plates are no more necessary, and bright projected images can be obtained, in which degradation of the hue resulting from the use of the dichroic mirror can be reduced by providing means for decreasing the dependence of the spectral characteristics of the dichroic mirror on the state of polarization, specifically, by setting the incident angle $\theta$ of light to the dichroic mirror within a range $10° < \theta < 40°$, or using a color split filter in combination with the dichroic mirror.

Further, since orientation treatment indispensable for the TN type liquid crystal display element is not necessary and the problems derived therefrom such as destruction of the active element caused by the static electricity generated upon treatment can also be avoided, production yield of the liquid crystal display element can be improved remarkably. Furthermore, since the liquid crystal and polymer composite is in the state of film after curing, it can reduce such problems as short circuitting between substrates due to the pressure applied to them and destruction of the active element caused by the movement of spacers.

Further, since the specific resistivity of the liquid crystal and polymer composite is equal with that of the TN mode and, in a case of using active elements on every picture element electrodes, it is not necessary to dispose a large storage capacitor on each picture element as in the case of the dynamic scattering mode, so that the design for the active element is easy and the electric power consumption by the liquid crystal display element can be kept low. Accordingly, since the material can be produced by merely eliminating the step of forming an oriented film from the production steps for conventional TN mode liquid crystal display elements, the production is easy.

The specific resistivity of the liquid crystal and polymer composite is, preferably, not less than $5 \times 10^9$ Ωcm and, more preferably, not less than $10^{10}$ Ωcm in order to minimize the voltage drop due to leak current, etc., in which there is not requirement for providing a large storage capacity on each of picture element electrodes. Since the dynamic driving characteristics of the transparent-scattering type liquid crystal display element in the present invention are poor as compared with those of the TN type liquid crystal display element, it is preferred to use the element as an active matrix liquid crystal display element by disposing an active element on each of picture element electrode. As the active element, there may be used, for example, a transistor, a diode or a non-linear resistor element, and two or more of active elements may be disposed to one picture element if necessary. The liquid crystal and polymer composite is put between an active matrix substrate which is disposed with such an active element and a picture element electrode connected therewith and a counter electrode substrate disposed with a counter electrode, to constitute a liquid crystal display element.

The liquid crystal color projection display apparatus according to the present invention at least comprises a projection light source, a transparent-scattering type liquid crystal display element for modulating light of each color and an optical projection system for projecting an image onto a projection screen, in which dichroic mirrors are used for the color splitting or color synthesis and the incident angle $\theta$ to at least one of dichroic mirrors is defined as: $10° < \theta < 40°$ or a color split filter is disposed in the optical path for the light of each color.

Specifically, the following constitution may be considered, in a case of using a dichroic mirror for the color synthesis means, lights passing through a plurality of liquid crystal display elements are synthesized by the color synthesis means using the dichroic mirror and the synthesized light is projected by an optical projection system on a projection screen. In this case, one projection light source is used and the light may be split into a plurality of lights by a color split means described later, or a plurality of color light sources are used, so that a specific color light source may be disposed to each of a liquid crystal display element.

In a case of using a color splitting filter, the color splitting filter may be disposed in an optical path from the light source for each of the colors or from the color split means to the color synthesis means.

In a case of using a dichroic mirror for the color split means, light from the projection light source may be entered into the color split means using the dichroic mirror and split lights may be entered separately into respective liquid crystal display elements. In this case, the lights passing through the respective liquid crystal display elements are synthesized by means of the color synthesis means described above and may be projected through one optical projection system or they may be projected from three optical projection systems and synthesized on a projection screen.

In a case of using a color splitting filter, the color splitting filter may be disposed in an optical path from the color split means for each color to the color synthesis means or to the optical projection system.

In a case of improving the characteristics by the tilting angle of the dichroic mirror in the present invention, the incident angle to at least one of the dichroic mirrors is set as: $10° < \theta < 40°$, by which the degradation of the hue can be reduced. In particular, by setting the angle $\theta$ as: $15° < \theta < 35°$, the effect of reducing the degradation of the hue becomes excellent and there is less problem in view of the area and the effective optical path length of the dichroic mirror.

This dues to the fact that the required length for the dichroic mirror is increased along with the increase of the angle $\theta$. Assuming the effective length (=the length of the liquid crystal display element) l, the required length L for the dichroic mirror is expressed as $L = l/\cos\theta$ and, accordingly, the required length for the dichroic mirror is increased along with the increase of $\theta$. Accordingly, it is preferred to decrease the incident angle $\theta$ for reducing the length, that is, the area of the dichroic mirror.

As the area of the dichroic mirror is increased, difficulty is increased in view of keeping the flatness of the substrate, maintaining the uniform thickness of the dielectric multi-layered film, etc. and the productivity is reduced. Further, deviation in the optical path between the incident light and the outgoing light due to the thickness of the substrate for the dichroic mirror is increased to bring about a problem of difficult adjustment.

On the other hand, as the angle $\theta$ is decreased, the required length for the dichroic mirror is shortened, but the path length from the optical source to the optical projection system is increased.

As the path length is increased, there are problems that the effective amount of light is reduced and the capacity of the liquid crystal display apparatus increases.

Referring to the incident angle to the dichroic mirror in the present invention, it is usually preferred to set the incident angle to all of the dichroic mirrors as: $10° < \theta < 40°$ in view of the hue of the projection image.

In the case of improving the characteristics with the color splitting filter in the present invention, the color splitting filter is disposed in the path of the light for each color. As the typical example of the color splitting filter, optical interference color splitting filter or optical absorption color splitting filter can be mentioned.

In the optical interference color splitting filter, the multi-layered film is disposed on the substrate in the same manner as in the dichroic mirror, to split the light into that of transmission and of reflectance with respect to a predetermined wavelength as a boundary.

If the light enters obliquely to the filter surface in the optical interference color splitting filter, the color purity is reduced since the boundary wavelength between the transmission and the reflection is different depending on the state of the polarization as described previously. Accordingly, the incident angle is adjusted so as to be substantially vertical. Since the optical interference color splitting filter shows an abrupt change of the transmittance with respect to the boundary wavelength between the transmission and the reflection and provides less optical loss, it is suitable to a liquid crystal color projection display apparatus.

As the optical absorption color splitting filter, those absorbing light at not less than a predetermined wavelength, those absorbing light at not more than a predetermined wavelength or those absorbing light at other than the specific wavelength region are used. In the optical absorption color splitting filter, the color purity is not reduced even if the light is entered obliquely to the filter surface. Accordingly, the filter may be laminated on the dichroic mirror. The optical absorption color splitting filter shows more moderate change of the transmittance with respect to the boundary wavelength between the transmission and the reflection and the light loss is increased. Accordingly, the color purity tends to be reduced. However, it is applicable to various application uses such as stacking on the dichroic mirror, separately disposing on an optical path, lamination on the substrate for the liquid crystal display element or coloring the substrate itself.

In this case, the dichroic prism can also be used as a dichroic mirror.

The projection light source in the present invention may be a light source exclusively used on every colors, or light from one optical source may be separated by a color split means for use. The plurality of lights are entered into separate transparent-scattering type liquid crystal display elements in accordance with the present invention.

The transparent-scattering type liquid crystal display element usable herein comprises a liquid crystal and polymer composite put between a pair of substrates each equipped with an electrode in which a liquid crystal material is dispersed and held in a polymer matrix, and which provides a light transmission state when the refractive index of the polymer matrix substantially agrees with the refractive index of the liquid crystal material and provides a light scattering state when both of them do not agree with each other, depending on the state of the voltage application. A liquid crystal display element comprising a liquid crystal and polymer composite in which the refractive index of the polymer matrix substantially agrees with the ordinary refractive index ($n_o$) of the liquid crystal material used is particularly preferably and a liquid crystal display elements, in which the refractive index of the polymer matrix substantially agrees with the refractive index of the liquid crystal material under the state of applying voltage to provide a light transmission state and agree with each other under the state of non-application of voltage to provide a light scattering state is preferable.

When an active matrix substrate disposed with an active element such as TFT is used for one of the substrates each equipped with electrode, a liquid crystal display element of high saturation can be made.

The liquid crystal and polymer composite may comprise a polymer matrix having a plurality of fine holes and liquid crystal filled in the holes and it may have such a structure that liquid crystal is enclosed in the vacuoles such as microcapsules, wherein the microcapsules are not completely independent of each other or such a structure that individual vacuoles for the liquid crystal may be connected to each other by means of fine gaps like that in the porous material.

The liquid crystal and polymer composite used for the liquid crystal display element according to the present invention can be prepared by mixing a liquid crystal material and a polymer matrix-forming material into a solution or a latex, by curing the solution or latex by application of light or heat, or by removing solvent or by subjecting it to reactive curing thereby separating polymer matrix and dispersing the liquid crystal material into the polymer matrix.

Use of the light-curable or heat-curable type polymer is preferred since it can be cured in an enclosed system.

In particular, use of a light-curable type polymer is preferred since it can be cured in a short period of time with little influence of heat.

Further, by using the liquid crystal material as a solvent for the liquid crystal and polymer composite and curing the light-curable resin by means of exposure to light, there is not requirement for evaporizing solvent or water upon curing. Accordingly, since curing is possible in an enclosed system, the conventional production process of injection into the cell can be adopted as it is to provide high reliability and, since the light-curable polymer has an effect of bonding two substrates, the reliability is further improved.

As a specific production method, the cell may be formed by using a sealing material, uncured mixture of the liquid crystal material and the polymer matrix (which includes pre-polymer) is injected from the injection port and, after sealing the injection port, they can be cured by light-irradiation or heating in the same manner as in the conventional TN type liquid crystal display element.

The liquid crystal display element according to the present invention may also be prepared without using a sealing material, for example, by supplying an uncured mixture of the liquid crystal material and the polymer matrix on a substrate coated with a transparent electrode as the counter-electrode, overlaying the other substrate and then curing the material by means of light-irradiation, etc.

The periphery may be sealed by coating the sealing material. According to this production method, since it is only required to supply the uncured mixture of the liquid crystal material and the polymer matrix by means of coating such as roll coating, spin coating, printing and by the method of using a dispenser or the like, the injection step is simple and convenient and the productivity is extremely high.

Further, the uncured mixture of the liquid crystal material and the polymer matrix may be incorporated with spacers for controlling the inter-substrate gap such as ceramic particles, plastic particles or glass fibers, pigments, dyes, viscosity controllers, or any other additives which does not adversely influence to the performance of a liquid crystal display element of the present invention.

The liquid crystal display element using the liquid crystal and polymer composite in the present invention has a response time of about 3 to 50 msec for the rising time upon voltage application and about 10 to 80 msec for the falling time upon removal of the voltage, which is faster as compared with the conventional TN type liquid crystal display element.

Further, the electro-optical characteristic of the voltage-transmittance dependency of the liquid crystal display element is relatively moderate, therefore, driving of the liquid crystal display element to indicate gray scale is easier as compared with the conventional TN type liquid crystal display elements.

In the liquid crystal display element using the liquid crystal and polymer composite, higher transmittance in the light transmission state is preferable and the haze value in the light scattering state is preferably not less than 80%. In the liquid crystal display element, it is preferred that the refractive index of the polymer matrix (after curing) agrees with the ordinary refractive index ($n_o$) of the liquid crystal material used in a state of applying the voltage.

Thus, light is transmitted when the refractive index of the polymer matrix agrees with the refractive index of the liquid crystal material, while the light is scattered (opaque) when both of them does not agree with each other. The scattering property of the element is higher than the liquid crystal display element in the conventional DS mode and a projection display at higher contrast ratio can be obtained.

The volumetric fraction $\phi$ of the operable liquid crystal material in the liquid crystal and polymer composite is preferably greater than 20% and, more preferably, greater than 35% for obtaining higher scattering property. On the other hand, if the volumetric fraction $\phi$ is excessively great, the structural stability of the liquid crystal and polymer composite is worsened and, accordingly, it is preferably less than 70%.

By using a nematic liquid crystal of positive dielectric anisotropy and making the refractive index of the polymer matrix substantially identical with the ordinary refractive index ($n_o$) of the liquid crystal material used, a scattering state (opaque state) is shown under the state where the electric field is not applied due to the difference of the refractive index between the liquid crystal and the polymer matrix. Therefore, in the case of using as the projection type display apparatus as in the present invention, since light is scattered at the area other than the electrode and, since the light does not reach the projection screen without providing the light shielding film at the area other than the picture element, it appears dark. Thus, it is not more necessary to shield the area other than the picture element electrode with the light shielding film, etc. in order to prevent the leakage of light from the area other than the picture element electrode, and there is also a merit that the step of forming the shielding film is no more required.

Then, an electric field is applied to desired picture elements. In the area of the picture elements applied with the electric field, the liquid crystal is arranged, by which the ordinary refractive index ($n_o$) of the liquid crystal material agrees with the refractive index of the polymer matrix ($n_p$) to provide a light transmission state, so that the light is transmitted through the desired picture elements and gives bright display on the projection screen.

Furthermore, in the present invention, since a plurality of liquid crystal display elements are used to modulate light on every colors, it is preferable to optimize the size of the liquid crystal particle, the inter-substrate gap, etc. of the liquid crystal display elements depending on the wavelength of incident light. Further, it is preferred to establish a color balance driving at an identical driving waveform.

BRIEF DESCRIPTION OF THE DRAWINGS

FIG. 8 is a graph showing the color splitting characteristic of a dichroic mirror and FIGS. 9A and 9B are graphs showing the difference of the color splitting characteristic of the dichroic mirror with a color filter between just before color splitting filter and just after color splitting filter.

DETAILED DESCRIPTION OF THE DRAWINGS

Preferred embodiments of the present invention will be described with reference to the drawings.

Figure 1:
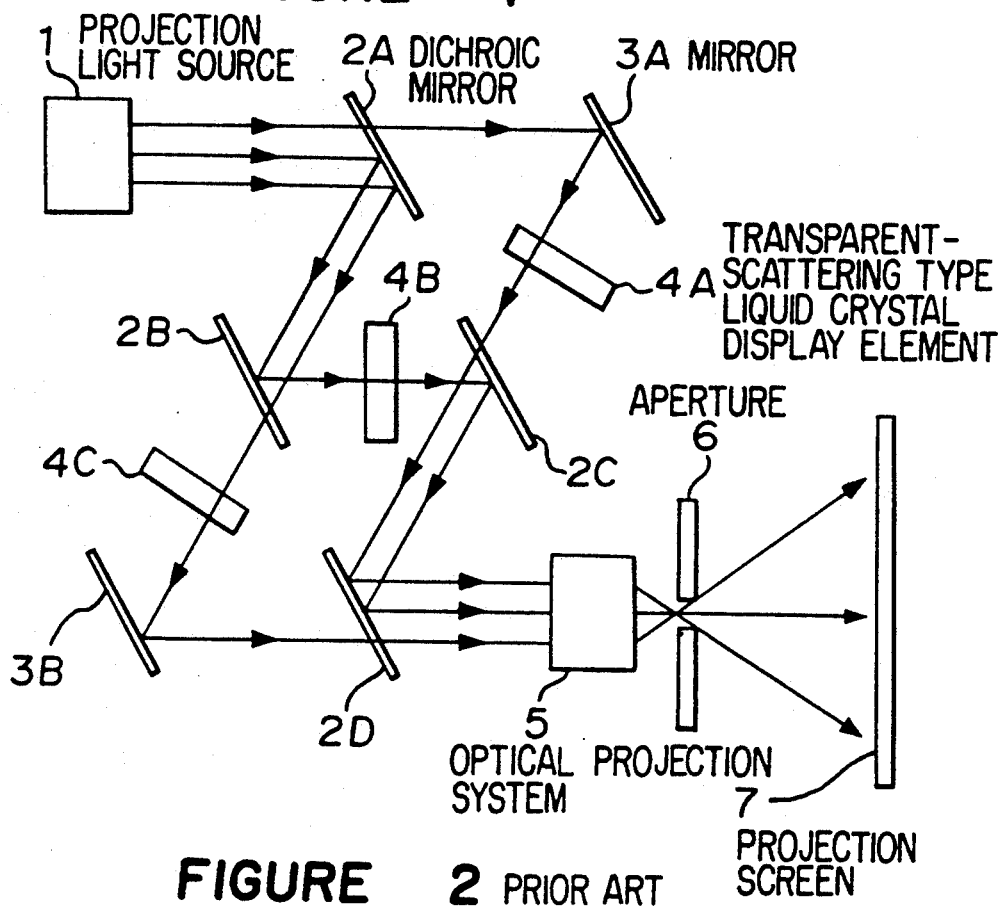
FIG. 1 is a schematic view illustrating the structure of an embodiment of a liquid crystal color projection display apparatus according to the present invention.

FIG. 1 is a diagram showing one embodiment of a liquid crystal color projection display apparatus according to the present invention.

In FIG. 1, there are shown a projection light source 1, dichroic mirrors 2A, 2B, 2C and 2D, mirrors 3A and 3B, transparent-scattering type liquid crystal display elements 4A, 4B and 4C, and optical projection system 5, an aperture 6 for eliminating the scattering light other than the straight forward light and a projection screen 7 for projecting an image.

The incident angle $\theta$ of the light to the dichroic mirror is set as $\theta = 30°$ in this embodiment but it is not restricted only thereto and the angle may be set optionally so long as it can satisfy the relationship: $10° < \theta < 40°$. It is particularly, preferable that $\theta$ is from 15° to 35°.

Figure 7:
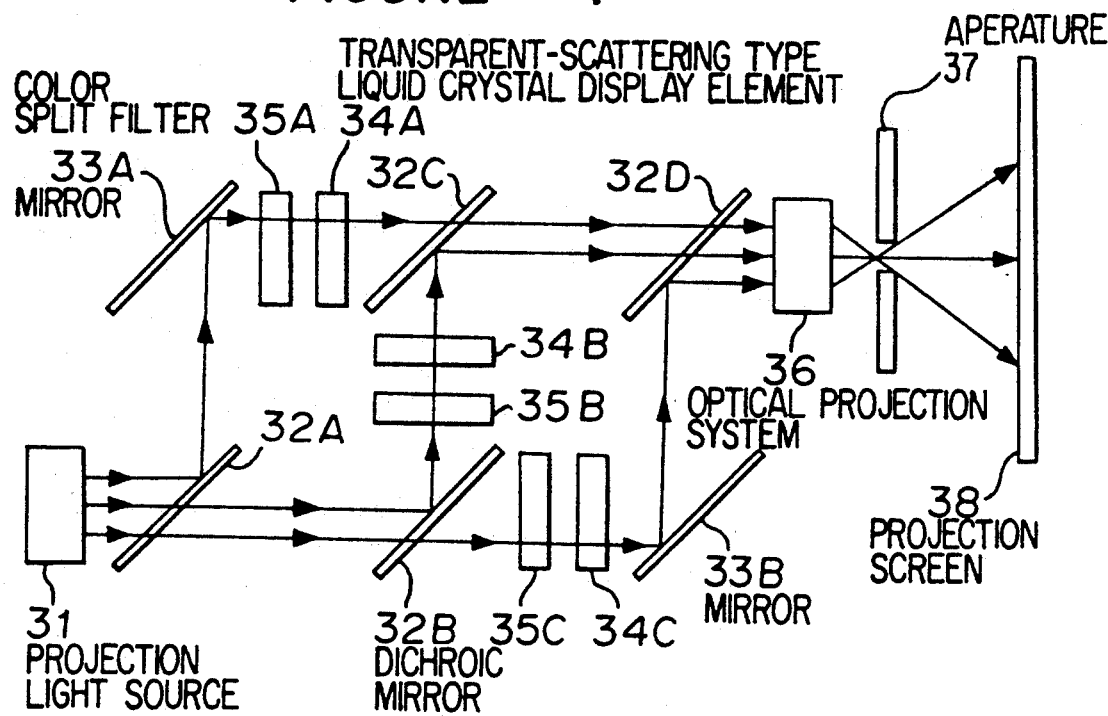
FIG. 7 is a schematic view illustrating the construction of another embodiment of the liquid crystal color projection display apparatus according to the present invention.

FIG. 7 is a diagram for another embodiment of the liquid crystal color projection display apparatus according to the present invention.

In FIG. 7, there are shown a projection light source 31 dichroic mirrors 32A, 32B, 32C and 32D, mirrors 33A and 33B, transmission-scattering type liquid crystal display elements 34A, 34B and 34C, color splitting filters 35A, 35B and 35C, an optical projection system 36, an aperture 37 for eliminating light other than the straight forward light and a projection screen 38 for projecting an image.

In this embodiment, each of the color split filters 35A, 35B and 35C is disposed between the color splitting dichroic mirror and the liquid crystal display element respectively.

In the case of the arrangement as in this embodiment in which a color splitting filter is separately disposed in the optical path, an optical interference color splitting filter or optical absorption color splitting filter may be used.

The transparent-scattering type liquid crystal display element according to the present invention comprises a liquid crystal and polymer composite put between a pair of substrates each equipped with an electrode, in which the liquid crystal material is dispersed and held in the polymer matrix, and the refractive index of the liquid crystal changes in accordance with the state of voltage application, to provide a light transmission state when the refractive index of the polymer matrix substantially agrees with the refractive index of the liquid crystal material used and to provide a light scattering state when both of them do not agree to each other. Among all, the liquid crystal display element providing a light transmission state under the application of voltage is preferred and, specifically, a liquid crystal and polymer composite in which the refractive index of the polymer matrix substantially agrees with the ordinary refractive index ($n_o$) of the liquid crystal material used in preferable. As the substrate equipped with electrode, a transparent substrate such as made of glass or plastic formed with a transparent electrode such as of $In_2O_3$-$SnO_2$ (ITO) or $SnO_2$ and further applied with patterning if required may be used.

Although the electrode is usually transparent, a metal electrode such as made of chromium or aluminum may be used together for providing leads of a low resistance to a part thereof.

Further, if the number of picture elements is large, active elements may be disposed. In a case of using a three terminal element such as TFT (thin film transistor) as the active element, a solid electrode in common with all picture elements may be disposed for the counter-electrode substrate. In the case of using a 2-terminal elements such as an MIM element or a PIN diode, the counter-electrode substrate is applied with a stripe-like patterning.

In the case of using TFT as the active element, silicon is suitable as the semiconductor material. Polycrystalline silicon is particularly preferred since it has less photosensitivity as in amorphous silicon and, accordingly, does not cause erroneous operation even without shielding light from a light source by means of light shielding film. In the case of using polycrystalline silicon for the liquid crystal projection display apparatus as in the present invention, since a strong light source for projection can be utilized, a bright display can be obtained.

In the case of using amorphous silicon as the active element or using an extremely strong projection light source to which the polycrystalline silicon is photosensitive, a shielding film may be formed on the side of the incident surface of silicon like that in conventional TFT.

In the case of the usual TN type liquid crystal display element, a light shielding film is often formed between picture elements so as to suppress the leakage of light from the portion between the elements and a light shielding film can be formed at the same time also to the active element by utilizing the step in common and, accordingly, formation of the light shielding film to the active element portion gives no substantial effect on the entire steps. That is, if the polycrystalline silicon is used for the active element and the light shielding film is not formed to the active element portion, the number of steps can not be decreased if it is required to form the light shielding film at the portion between the picture elements.

On the contrary, in the present invention, using a liquid crystal and polymer composite in which the refractive index of the polymer matrix substantially agrees with the ordinary refractive index ($n_o$) of the liquid crystal material used as described above, since the light is scattered at the area not applied with the electric field and it appears dark on the projection screen, there is no requirement for forming the light shielding film in the portion between the picture elements. Therefore, in the case of using polycrystalline silicon as the active element, since there is no requirement for forming the light shielding film at the active element portion, the step of forming the light shielding film can be saved, thereby decreasing the number of steps and improving the productivity.

In the liquid crystal color projection display apparatus according to the present invention, an infrared ray cut filter or UV-ray cut filter may be used or characters, figures, etc. may be printed.

In the case of using a light-curable polymer as an uncured polymer constituting the liquid crystal and polymer composite as described above in the present invention, light-curable vinyl polymer is preferably used.

Specifically, there can be exemplified a light-curable acryl polymer and, particularly, those containing acryl oligomer which is curable upon polymerization under the irradiation of light are particularly preferred.

The liquid crystal material used in the present invention may be such a liquid crystal that the refractive index of the polymer matrix agrees with the refractive index of the liquid crystal material under the state of applying or not applying voltage. In particular, it is preferred to use such a liquid crystal that the refractive index of the polymer matrix agrees with the ordinary light refractive index ($n_o$) of the liquid crystal material. The liquid crystal material may be used solely or may be used as a composition, but the use of a composition can be said advantageous for satisfying various demands such as for working temperature range, working voltage, etc.

By using the liquid crystal and polymer composite, a liquid crystal display element capable of controlling the states of light between transmission and scattering can be manufactured with extremely high productivity with less danger of short circuitting between the upper and the lower transparent electrodes and with no requirement for the strict control of the orientation or the inter-substrate gap as in the usual TN type display element.

As the projection light source in the present invention, there can be used such a projection light source comprising, in combination, a conventional light source such as halogen lamp, xenone lamp, metal halide lamp, etc. and an optical reflection system such as a spherical reflection mirror or parabollic reflection mirror, and optical condensing system such as a condenser lens. Further, infrared ray cut filter or UV-ray cut filter or cooling means may be used together if necessary.

The color split means is used in the case of not separately disposing a plurality of light color sources, in which a dichroic mirror is used. Thus the dichroic prism may also be used for the color split means. The lights from the projection light source is split into light of plurality of colors. As a typical example, the light is split into three colors, i.e. R, G and B.

The liquid crystal display element is separately disposed in the optical path for the light of each color.

The lights of different colors passing through the liquid crystal display elements are synthesized by a color synthesis means. The respective lights may individually be projected from respective optical projection means on a projection screen and then images may be synthesized on the projection screen. Dichroic mirror is used for the color synthesis means. A dichroic prism may also be used. Thus, lights of respective colors transmitted through the liquid crystal display elements separately are synthesized and projected through an optical projection system onto a projection screen.

For the optical projection system, any of conventional optical projection systems may be used.

Further, a device for diminishing the scattering light disposed on the optical path, for example, an aperture or spot as shown by a numeral 6 in FIG. 1, by which the display contrast can be increased.

Namely, it is preferable to use a device for diminishing scattering light that selectively outputs only the light forwarding straightly relative to the incident light (light passing through the area of the picture element in a transparent state) and diminishes the light not forwarding straightly among the lights after passing through the liquid crystal display element in view of improvement for the contrast ratio. In particular, it is preferable to diminish the scattering light not forwarding straightly without diminishing the light forwarding straightly.

The device for diminishing the scattering light may be disposed between the optical projection system and the projection screen as shown in FIG. 1, or it may be disposed in the optical projection system, for example, between lenses in a case where the optical projection system comprises a plurality of lenses.

The device for diminishing the scattering light is not restricted to the aperture or the spot as described above but, for example, it may be a mirror of a small area disposed on the optical path.

The light intensity ratio between the straight forward ingredient and the scattering ingredient reaching the projection screen can be controlled depending on the diameter of the spot or the mirror and the focal length of the lens and they may be set such that desired display contrast or display brightness can be obtained.

The liquid crystal color projection display apparatus according to the present invention may be used as a front projection type or rear projection type.

The dielectric multi-layered film that determines the spectral characteristics of a dichroic mirror has a basic structure that the optical film thickness nd of the dielectric film can satisfy the relationship: $nd \cdot \cos\theta = \lambda_o/4$ relative to the central wavelength $\lambda_o$ in the reflection region, the reflection wavelength region is formed by alternatively laminating a plurality of high refractive index film and low refractive index film, and a dielectric film of an appropriate refractive index and film thickness is attached to both ends of the multi-layered film satisfying a relationship: $nd \cdot \cos\theta = \lambda_o/4$ in order to eliminate ripples left in the remaining transmission wavelength region.

Figure 4:
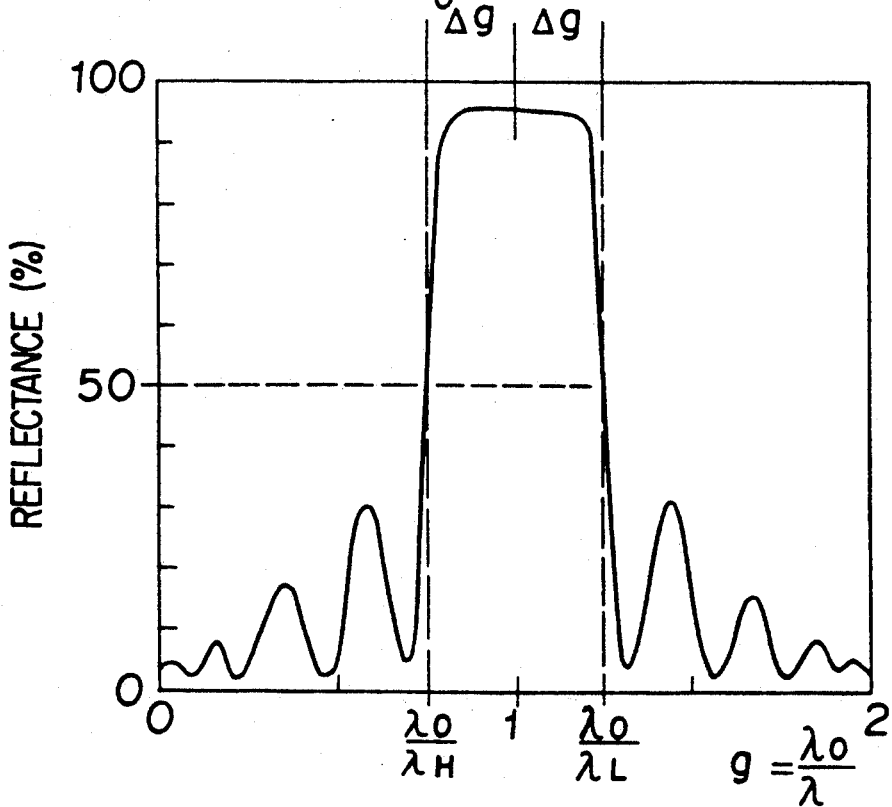
FIG. 4 is a graph showing the spectral reflectance of a dielectric multi-layered film.
Figure 5A:
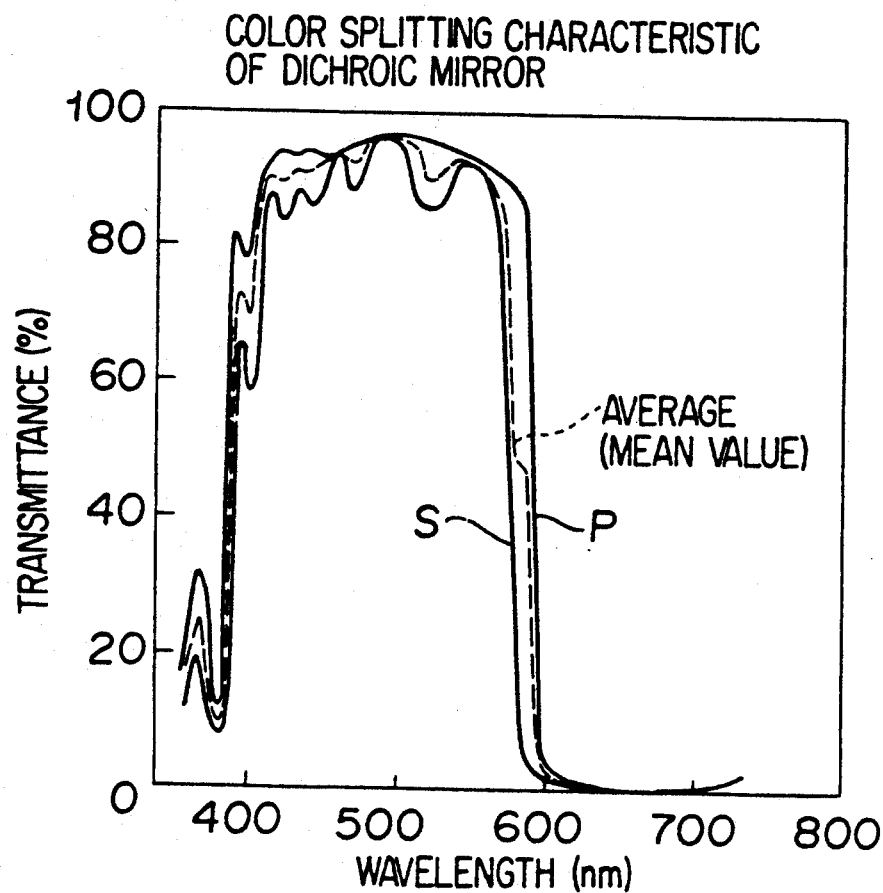
FIG. 5A is a graph showing the color splitting characteristic of a dichroic mirror.
Figure 5B:
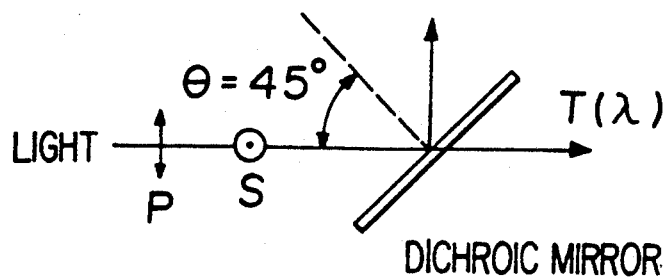
FIG. 5B shows a dichroic mirror with incident angle $\theta = 45°$.
Figure 6A:
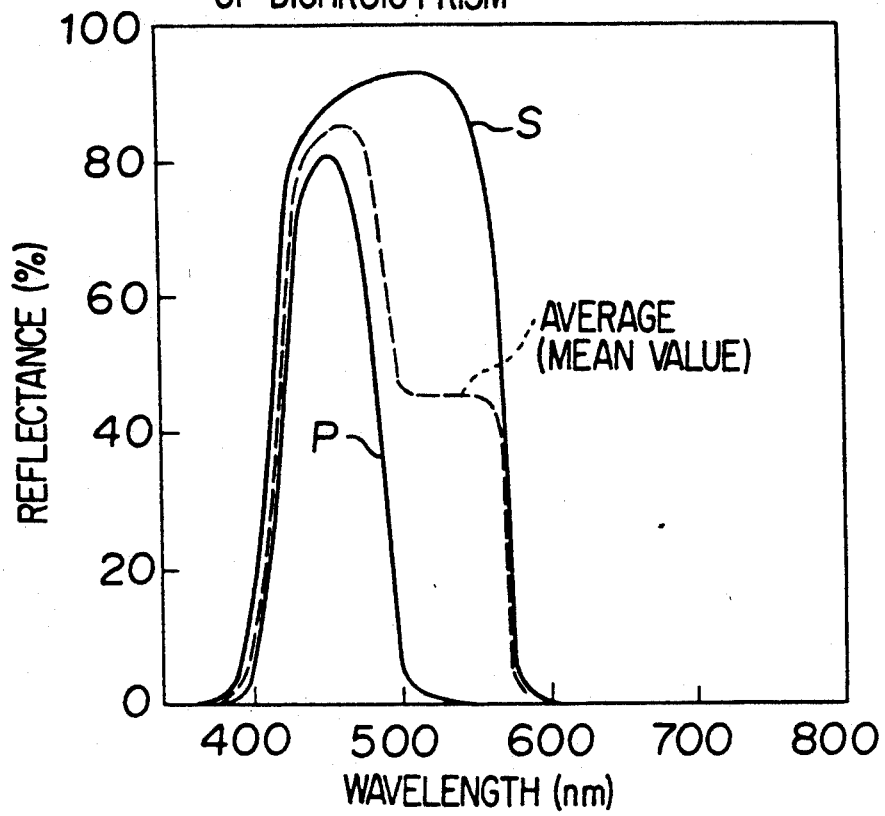
FIG. 6 is a graph showing the color splitting characteristic of a dichroic prism.
Figure 6B:
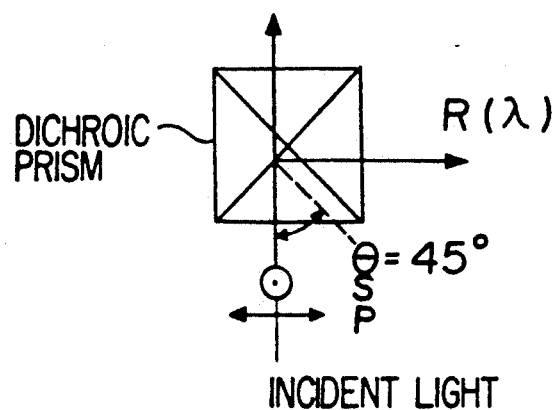

In this case, characteristics such as the reflectance of the reflection region, the slope of the boundary wavelength region between the reflection region and the transmission region, and the wavelength width of the reflection region depend on the physical quantity such as the number of layers N, high refractive index $n_H$ and low refractive index $n_L$ of the multi-layered film and so on that can satisfy the relationship: $nd \cdot \cos\theta = \lambda_o/4$. FIG. 4 shows the dependence of reflectance upon wavelength of the multi-layered film satisfying the relationship: $nd \cdot \cos\theta = \lambda_o/4$ with the central wavelength of $\lambda_o$.

Assuming the wavelength corresponding to 50% reflectance at the reflection boundary as $\lambda_L$, $\lambda_H$ respectively, the reflection range half-width with:

$$\Delta g = 1 - \frac{\lambda_o}{\lambda_H} = \frac{\lambda_o}{\lambda_L} - 1$$

can be expressed by the following equation (1):

$$\Delta g = \frac{2}{\pi} \sin^{-1}\left[\frac{\eta_H - \eta_L}{\eta_H + \eta_L}\right] \quad (1)$$

where $$\eta_H = \begin{cases} n_H/\cos\theta_H : P \text{ polarization} \\ n_H \cdot \cos\theta_H : S \text{ polarization} \end{cases} \quad (2)$$

$$\eta_L = \begin{cases} n_L/\cos\theta_L : P \text{ polarization} \\ n_L \cdot \cos\theta_L : S \text{ polarization} \end{cases}$$

Assuming the incident angle of light as $\theta$ and the refractive index of air as $n_o$, $\theta_H$ and $\theta_L$ can satisfy the Snell's law (3):

$$n_o \cdot \sin\theta = n_H \cdot \sin\theta_H = n_L \cdot \sin\theta_L \quad (3)$$

As has been described above, the problem resulting from the dependence of the spectral characteristic of the dichroic mirror on the state of P and S polarization, can be explained in such a causal relation that the dependence of the effective refractive index $\eta_H$ and $\theta_L$ of the multi-layered film relative to the increase of the incident angle $\theta$ from 0° to 90° becomes remarkable to the P and S polarization as shown in the equation (2) and, as a result, the reflection region width $\Delta g$ has a different value depending on the polarization state.

Accordingly, as compared with the conventional case in which all of the dichroic mirrors (including also dichroic prism) under the condition of the incident angle: $\theta = 45°$, the dependence of the spectral characteristics of the dichroic mirror on the state of the polarization can be reduced by arranging a dichroic mirror capable of satisfying the conditions $10° < \theta < 40°$ as the fundamental factors in the present invention. As a result, color split characteristic can be improved relative to incident light under random polarization.

Further, the required length L of the dichroic mirror and the deviation $\omega$ of optical path in the substrate of dichroic mirror which are dependent on the incident angle $\theta$, is as shown below:

$$L = l/\cos\theta \quad (4)$$
$$\omega = D \cdot \sin\theta \left[1 - \frac{\cos\theta}{\sqrt{n^2 - \sin^2\theta}}\right]$$

where l represents the length of the liquid crystal display element, and D and n represent, respectively, the thickness and the refractive index of the substrate for the dichroic mirror.

In view of the above, by setting the incident angle of light to the dichroic mirror as: $10° < \theta < 40°$, increase in the length and the deviation in the optical path thereof can be reduced.

Further, as compared with the conventional case of arranging all the dichroic mirrors (also including the case of the dichroic prism) under the conditions of incident angle $\theta = 45°$, the dependence of the spectral characteristics of the dichroic mirror is reduced by the combined use of the color splitting filter as the constituent factor of the present invention. As a result, the color splitting characteristic relative to the incident light under random polarization can be improved.

As a result, color display image at high purity can be obtained.

In the present invention, one of the substrates with electrodes may be a substrate with a reflecting electrode, or a reflecting plate may be disposed at the side of the liquid crystal display element, which is opposite the light incident side, whereby an outgoing light can be returned to the light incident side along the same optical axis with the incident light or with a slight deviation from the optical axis. By utilizing such measures as well as use of a reflecting type liquid crystal display element, a liquid crystal color projection display apparatus can be obtained.

EXAMPLE

Example 1

Deviation of wavelength at the reflection region boundary corresponding to two polarizations S and P, the ratio L/l for the length L of a dichroic mirror relative to the length l for a liquid crystal display element and the ratio $\omega/D$ for the deviation of the optical path to the thickness of the dichroic mirror are shown in Table 1 with respect to the incident angle $\theta$ of light to the dichroic mirror: $\theta = 0°$, 10°, 15°, 30°, 35°, 40° and 45°.

In Table 1, $\Delta\lambda eH$ shows the deviation of the wavelength at the longer wavelength side boundary in the reflection region, while $\Delta\lambda eL$ shows the wavelength deviation at the shorter wavelength side boundary in the reflection region.

The material for the multi-layered film of the dichroic mirror was $TiO_2$ ($n_H = 2.30$) and $SiO_2$ ($n_L = 1.45$), the refractive index of substrate glass was: n=1.52 and the wavelength: $\lambda_o$ was 550 nm.

TABLE 1

| $\theta$ | $\Delta\lambda eH$ | $\Delta\lambda eL$ | L/l | $\omega$/D |
|---|---|---|---|---|
| 0° | 0 nm | 0 nm | 1.000 | 0 |
| 10° | 2.2 nm | 0.6 nm | 1.015 | 0.060 |
| 15° | 4.4 nm | 2.2 nm | 1.035 | 0.092 |
| 30° | 18.2 nm | 9.9 nm | 1.155 | 0.198 |
| 35° | 24.8 nm | 13.8 nm | 1.221 | 0.240 |
| 40° | 31.9 nm | 18.2 nm | 1.305 | 0.285 |
| 45° | 40.2 nm | 22.6 nm | 1.414 | 0.336 |

By setting the incident angle as $\theta=30°$, the wavelength deviation $\Delta\lambda eH$ and $\Delta\lambda eL$ could be reduced to about one-half as those at $\theta=45°$, as well as L/l was reduced by about 18% and $\omega$/D was reduced by about 41% respectively.

Example 2

Three liquid crystal display elements for R, G, B light were manufactured.

Chromium was vapor deposited to a thickness of 60 nm on a glass substrate and then patterned to form a gate electrode. Subsequently, a silicon oxynitride film and an amorphous silicon film were deposited by using a plasma CVD apparatus. Then, they were annealed by using a laser to form polycrystalline silicon and patterned. Further, phsophorusdoped amorphous silicon and chromium were deposited by using a plasma CVD and a vapor deposition apparatus respectively and patterned so as to cover the polycrystalline silicon to form source electrodes and drain electrodes at the first layer. Further, ITO was vapor-deposited and patterned to form picture element electrodes. Subsequently, chromium and aluminum was continuously vapor deposited and patterned so as to connect the picture element electrodes with the source electrodes and the drain electrodes at the first layer to form source electrodes and drain electrodes at the second layer. Then, a silicon oxynitride film was again deposited by using a plasma CVD apparatus to form a protection film, thereby preparing an active matrix substrate.

A counter-electrode substrate using an identical glass substrate on which an ITO electrode was formed entirely over the whole surface and the previously prepared active matrix substrate were arranged such that their electrode surfaces are opposed to each other. Spacers of about 11.0 um diameter were put at the inside and the periphery was sealed by using an epoxy resin sealing material except for the portion of an injection port to prepare an empty cell with an inter-substrate gap of about 11.0 um.

6 parts of 2-ethylhexyl acrylate, 18 parts of hydroxyethyl acrylate, 20 parts of an acryl oligomer ("M-1200", manufactured by Toa Gosei Kagaku), 0.4 parts of "Dalocure 1116", manufactured by Merck as a light curing initiator and 62 parts of "E-8", manufactured by BDH as the liquid crystal were uniformly dissolved.

The mixture was injected through the injection port into the empty cell prepared by the procedures as described above and then the injection port was sealed.

The liquid crystal and polymer composite was cured by irradiating an UV-ray for 60 sec to prepare a liquid crystal display element for green display.

In the liquid crystal and polymer composite or the thus prepared liquid crystal display element, the average particle size of the liquid crystal was about 1.9 um, the refractive index anisotropy $\Delta n$ of the liquid crystal was about 0.24 and the dielectric anisotropy $\Delta\epsilon$ was about 15.6.

In the similar procedures, a liquid crystal display element for red color display (average particle size of about 2.4 um, inter-substrate gap of about 12.5 um) and a liquid crystal display element for blue color display (average particle size of about 1.5 um, inter-substrate gap of about 9.0 um) were prepared respectively. As shown in FIG. 1, two dichroic mirrors and one aluminum mirror were used as a color split means, two dichroic mirrors and one aluminum mirror were used as a color synthesis means, an optical system was arranged such that each of the mirrors had a light incident angle of 30°, and three liquid crystal display elements were disposed each in an optical path separated into R, G and B by the color split means such that the optical path length from the position where three colors were synthesized was equal to each other.

A white halogen lamp with a color temperature at 3200° K. was used as a projection light source. For the color splitting wavelength $\lambda_o$ (wavelength at 50% reflectance) relative to the incident angle: $\theta=30°$ and $\theta=45°$ as the spectral characteristics averaged for P and S polarization for the dichroic mirror, used in this example, $\lambda_o$ was 510 nm for the dichroic mirror 2A, 560 nm for the dichroic mirror 2B, 510 nm for the dichroic mirror 2C and 600 nm for the dichroic mirror 2D. As a result, the CIE chromaticity value showing the hue of the projected color image gave the results as shown in Table 2.

TABLE 2

| $\theta$ | CIE | B | G | R | White |
|---|---|---|---|---|---|
| Example 2 30° | x | 0.13 | 0.24 | 0.69 | 0.32 |
| | y | 0.08 | 0.71 | 0.31 | 0.33 |
| | Y | 28 | 170 | 72 | 270 |
| Comparative Example 1 45° | x | 0.12 | 0.30 | 0.65 | 0.38 |
| | y | 0.16 | 0.67 | 0.35 | 0.39 |
| | Y | 35 | 144 | 96 | 275 |

In the embodiment according to the present invention, clear images at high color purity for blue, red and green were obtained. Further, synthetic color approximate to an ideal white color (x=0.33, y=0.33) was obtained with no white balance adjustment. On the other hand, in Comparative Example 1 in which $\theta=45°$, since synthetic color of insufficient blue component was obtained, it was necessary to reduce the transmittance of red and green liquid crystal display elements by controlling the voltage applied to the liquid crystal display elements and this reduced the brightness and required complicate driving circuits.

Figure 2:
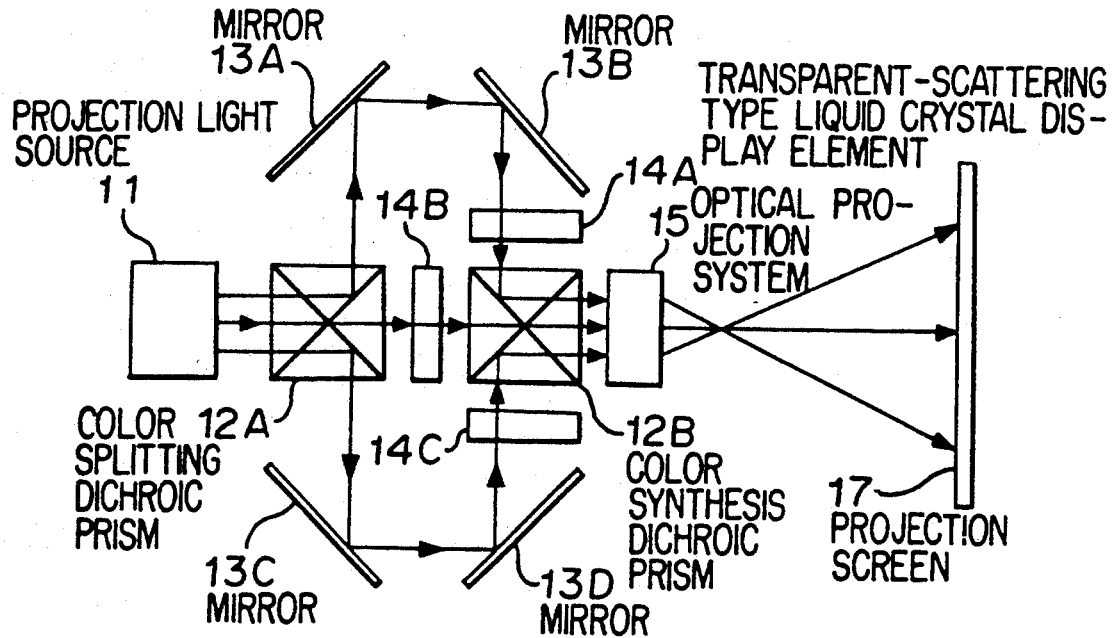
FIGS. 2 and 3 are diagrams showing conventional liquid crystal color display apparatuses.
Figure 3:
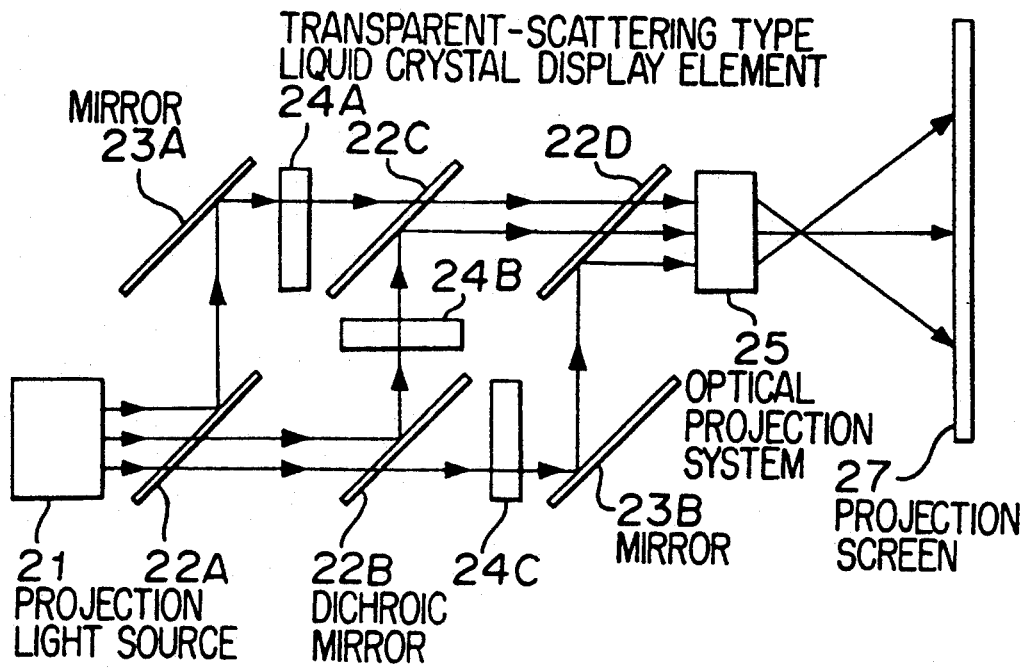

Further, in a case of using a conventional TN type liquid crystal display element (Comparative Example 2) as the liquid crystal display element, the color purity in the CIE colorimetric system indication using a conventional liquid crystal color projection display apparatus as shown in FIG. 2 was excellent in the same extent as that in the embodiment of the present invention, but only dark images with the brightness Y of not more than one-half could be obtained.

Example 3

The same liquid crystal color projection display apparatus was manufactured in the same manners as those in Example 2 except for changing the incident angle $\theta$ in Example 2 to 15°.

The liquid crystal color projection display apparatus was excellent in view of the color purity and whiteness over those in Example 2, the size of the mirror was reduced and the improvement of the mirror production yield could be increased. However, since the optical path length from the projection light source to the optical projection system was increased and the volume of the system is increased to reduce the effective amount of light, there was a drawback that the display was more dark as compared with Example 2.

In the embodiment described above, the color splitting and the color synthesis by the dichroic mirrors were conducted for of three colors, i.e., R, G and B but the invention is not restricted only thereto. Further the projection light source, color split means, liquid crystal display element using liquid crystal and polymer composite, color synthesis means and optical projection system, etc. are not restricted only to those shown in FIG. 1. Furthermore, although the incident angle was set identical to all of the dichroic mirrors, the effect of the present invention can also be obtained by setting the angle to $10° < \theta < 40°$ for at least one of the mirrors. However, by setting the incident angle to: $10° < \theta < 40°$ for all of the dichroic mirrors, the best effect can be obtained.

Example 4

As shown in FIG. 7, there were used a projection light source, two dichroic mirrors 32A, 32B and an aluminum mirror 33A as the color split means and two dichroic mirrors 32C, 32D and an aluminum mirror 33B as the color synthesis means, and an optical projection system, an aperture and a projection screen were arranged to manufacture a liquid crystal color projection display apparatus.

Three liquid crystal display elements used for R, G, and B were manufactured in the same procedures as those in Example 2 except for using glass substrates each equipped with an ITO electrode for both of the substrates. All of the incident angles of light to the dichroic mirrors 32A, 32B, 32C and 32D and the mirrors 33A, 33B were set to 45°. Optical interference color separation filters 35A, 35B and 35C were disposed, respectively, between the dichroic mirrors 32A, 32B or the mirror 33A and the liquid crystal display elements 34A, 34B and 34C and just before the liquid crystal display elements.

For the color splitting dichroic mirrors 32A, 32B, $\lambda_o$ was selected such that the color splitting wavelength at the transmittance value one-half of the greatest transmittance was 500 nm and 575 nm respectively.

Figure 8:
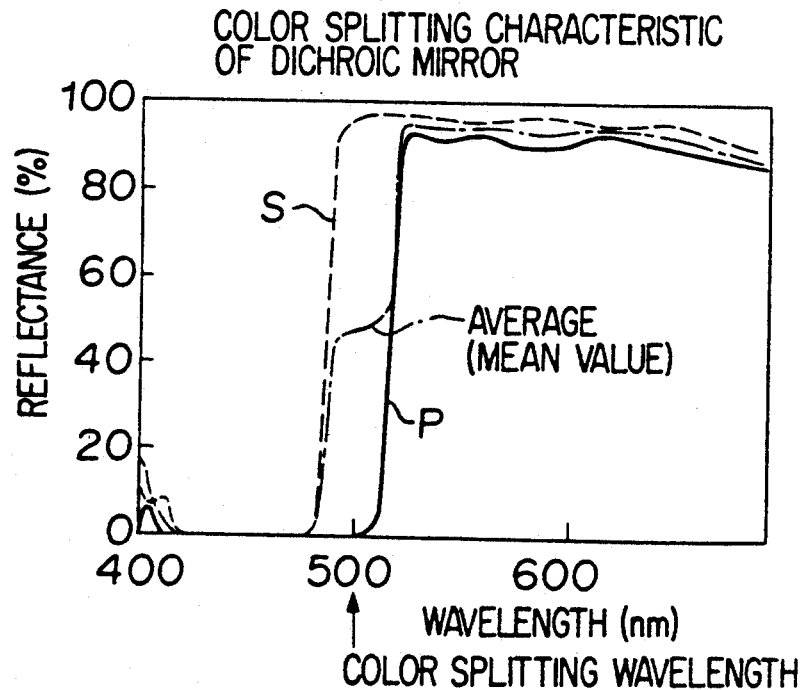

FIG. 8 shows a relationship between the transmittance and the wavelength of the dichroic mirror 32A for the splitting of blue color (blue reflection).

Blue light split through the dichroic mirror 32A (S polarization in the wavelength region of not more than about 485 nm, P polarization is in the wavelength region of not more than 515 nm) is insufficient for the color splitting at 485-515 nm. Accordingly, the color splitting filter 35A may have such a property of transmitting only the wavelength region of not more than 485 nm. FIG. 9(A) shows the state of the spectral intensity relative to the wavelength just before the color splitting filter and the spectral intensity relative to the wavelength just after the color splitting filter in the case of using such a color splitting filter 35A.

Thus, among the lights at a wavelength of not more than about 515 nm reflected under P-polarization, the lights at a wavelength not less than 485 nm are cut by the color splitting filter.

Green light separated by the dichroic mirrors 32A, 32B (S polarization in the wavelength region of about 515 to 560 nm, P polarization in the wavelength region of about 485-590 nm) is insufficient for the color splitting in 485-515 nm and 560-590 nm. Accordingly, the color splitting filter 35B should have a characteristic of transmitting only the light at a wavelength of 515-560 nm. FIG. 9(B) shows the states of the spectral intensity relative to the wavelength just before the color splitting filter and the spectral intensity relative to the wavelength just after the color splitting filter in the case of using the color splitting filter 5B.

Thus, among the lights reflected under P polarization, the light of wavelength regions which are from 485 nm to 515 nm and from 560 nm to 590 nm is cut by the color splitting filter.

In the same manner, red light transmitting both the dichroic mirrors 32A and 32B and reflected and split at the mirror 33B (S polarization in a wavelength region not less than about 560 nm, P polarization in the wavelength region not less than about 590 nm) is insufficient for the splitting of color in 560-590 nm. Accordingly, the color splitting filter 35C should have a characteristic of transmitting only the light at a wavelength region not less than 590 nm.

Thus, among the lights at a wavelength not less than about 560 nm reflected under S polarization, the light not more than 590 nm is cut by the color splitting filter. Since the amount of light thus cut is slight and the light at a wavelength near the center for each of the colors transmits completely, the entire amount of light is reduced only little to obtain display at high color purity.

The dichroic mirrors 32C and 32D for the color synthesis, $\lambda_o$ may be selected such that the color splitting wavelength at a transmittance value one-half of the maximum transmittance is 500 nm and 575 nm respectively in the same manner as in the case of the color splitting dichroic mirror.

In the present invention, a color splitting filter for cutting only the wavelength region at which the color purity is reduced by each polarization may be used as in this embodiment. Depending on the case, a color splitting filter of cutting a broader range may also be used. Specifically, in the case of the red color in the above-mentioned embodiment, light at a wavelength, for example, of not more than 620 nm may be cut.

In this case, the color splitting wavelength may be set to the side of longer wavelength, for example, 600 nm for the color synthesis dichroic mirror 32D.

Table 3 shows the CIE chromaticity value for three R, G and B colors in the case of using the color splitting filter (Example 4) and not using the color splitting filter (Comparative Example 3). As the light source, a halogen lamp having a color temperature of 3200° K. was used.

As apparent also from Table 3, clear color images having particularly high purity for blue and green colors can be obtained in the embodiment according to the present invention.

TABLE 3

|  |  | B | G | R |
| --- | --- | --- | --- | --- |
| Example 4 | x | 0.176 | 0.268 | 0.663 |
|  | y | 0.087 | 0.678 | 0.304 |
| Comparative | x | 0.158 | 0.321 | 0.660 |

TABLE 3-continued

|  |  | B | G | R |
|---|---|---|---|---|
| Example 3 | y | 0.143 | 0.607 | 0.313 |

Further, although the color splitting filter is disposed just before the liquid crystal display element (on the incident side), it may be disposed behind the element.

Example 5

An active matrix substrate in which an amorphous silicon TFT (attached with light shielding film) was disposed to each of picture element electrodes was prepared for the substrate of the liquid crystal display element.

A counter electrode substrate made of an identical glass substrate formed with an ITO electrode evenly over the entire surface and the active matrix substrate prepared as described above were arranged such that their electrode surface are opposed to each other and three liquid crystal display elements were prepared in the same procedures as those in Example 2.

A liquid crystal color projection display apparatus was manufactured by using the liquid crystal display elements in the same procedures as those in Example 4.

The liquid crystal color projection display apparatus could obtain bright projection images with high color purity like that in Example 4.

Example 6

In the liquid crystal color projection display apparatus in Example 5, the color splitting filter was not disposed separately but formed directly on the surface of the substrate for the liquid crystal display element.

The liquid crystal color projection display apparatus could provide a bright projection image with high purity as in Example 5.

Example 7

Substrates having color absorption characteristic were used as the substrates for the dichroic mirrors 32A and 32B and a substrate having a color absorption characteristic was also used for the mirror 33A instead of the color splitting filter in Example 4.

For the dichroic mirrors 32A and 32B, $\lambda_o$ was selected such that the color split wavelength was 500 nm and 575 nm respectively in the same manner as in Example 4.

The substrate having the color absorption characteristic for the dichroic mirror 32A has a property of absorbing the light at a wavelength region of not more than 510 nm, while the substrate having the color absorption characteristic for the dichroic mirror 32B has a property of absorbing a light at a wavelength region of not more than 610 nm. As the substrates, "Y-51" and "R-61", etc. commercially available from Shot Co., Hoya Co., etc. can be used.

The liquid crystal color projection display device showed somewhat lower color purity than that in Example 4, but it had higher color purity as compared with that in Comparative Example 3 and could provide a bright projection image.

Same effects can also be obtained by using a substrate having color splitting property as the substrate for the liquid crystal display element instead of the substrate for the dichroic mirror.

Example 8

Instead of the substrate having the color absorption characteristic in Example 7, a color filter in which a colored film was coated on a transparent substrate was disposed in an optical path to prepare a projection type liquid crystal color display apparatus.

The liquid crystal color projection display apparatus showed somewhat lower color purity than that in Example 7, but it had higher color purity and a bright projection image as compared with that in Comparative Example 3.

Since the liquid crystal color projection display apparatus according to the present invention uses a liquid crystal display element comprising a liquid crystal and polymer composite as the liquid crystal material put between a pair of substrates each equipped with an electrode and capable of electrically controlling the light scattering state and the light transmission state, polarization plates are no more necessary, light transmittance upon transmission state can be improved remarkably to obtain a bright projection color image.

In the liquid crystal color projection display apparatus according to the present invention, since the polarization dependence of the spectral characteristics of dichroic mirror can be reduced, a clear color image at high purity and of excellent hue can be obtained.

Further, since the area for the dichroic mirror and the mere reflection mirror used for the color split means and the color synthesis means can be decreased in a case where the incident angle to the dichroic mirror is set to 10°–40°, the uniformity for the spectral characteristic within the surface of the dichroic mirror can be improved, as well as the production yield can be increased to obtain a small and inexpensive liquid crystal color projection display apparatus.

Furthermore, since the deviation of the optical path of light transmitting through the dichroic mirror can be reduced in this case, adjustment for the optical axis can be facilitated and the degradation of the image quality caused by the deviation of the optical axis in the color image obtained by synthesizing the images from liquid crystal display elements for a plurality of colors can be improved.

The present invention can be applied to various uses, within a range not deteriorating the effect of the invention.

What is claimed is:

1. A liquid crystal color projection display apparatus comprising:
   a single projection light source;
   a color splitting means comprised of a mirror and two dichroic mirrors which product three kinds of color light having different wavelength regions from said projection light source;
   three liquid crystal display elements which are transparent-scattering type liquid crystal display elements and which respectively modulate the three kinds of color light which are split from the light of said projection light source;
   a color synthesis means comprising a mirror and two dichroic mirrors for synthesizing light outgoing from the liquid crystal display elements;
   an optical projection system for projecting the synthesized light onto a projection screen; and
   wherein the colored light travels straight along an optical axis which is perpendicular to the surface of said liquid crystal display elements and wherein each of the mirrors has essentially a same light incident angle θ and wherein said incident angle θ is between 15° and 35° with respect to the normal to the surface of said mirrors.

2. An apparatus as in claim 1 wherein the incident angle is approximately 30°.

3. An apparatus as in claim 1 wherein said liquid crystal display elements are comprised of:
a liquid crystal and polymer composite placed between a pair of substrate provided with electrodes; and
wherein a liquid crystal material is dispersed and held in a polymer matrix which substantially agrees with the ordinary refractive index ($n_o$) of the liquid crystal material used.

4. An apparatus as in claim 1 wherein:
the optical path length on the optical axis between one surface of the mirrors and an adjacent mirror is approximately equal to the optical path length between said adjacent mirror and another adjacent mirror.

5. An apparatus as in claim 1 wherein:
the optical path length on the optical axis between one of the dichroic mirrors and an adjacent mirror is equal to the optical path length between said adjacent mirror and another adjacent mirror such that all dichroic mirrors are placed on top of rectangular triangles.

6. An apparatus as in claim 5 wherein:
the optical axis of light from the light source is parallel to the optical axis of light from the optical projection system; and
the optical path from the light source to the optical projection system is in the shape of the letter Z.

7. An apparatus as in claim 1 wherein the color splitting wavelength from the dichroic mirrors for a split blue color is 510 nm and for the green color is 560 nm and for a red color is 600 nm.

8. The liquid crystal color projection display apparatus according to claim 3, wherein a light curable or heat curable resin is used as the material for forming the polymer matrix.

9. The liquid crystal color projection display apparatus according to claim 8, wherein the liquid crystal material is used as a solvent for the liquid crystal and polymer composite and the light curable resin is cured by exposure to light.

10. The liquid crystal color projection display apparatus according to claim 8, wherein a cell is formed by using a sealing material, a non-cured mixture of the liquid crystal material and the polymer matrix is injected through and injection port, said injection port is sealed and then the mixture is cured under irradiation of light or heating.

11. The liquid crystal color projection display apparatus according to claim 3, wherein active elements are disposed to one of said substrates.

12. The liquid crystal color projection display apparatus according to claim 11, wherein the active elements are thin film transistors.

13. The liquid crystal color projection display apparatus according to claim 12, wherein the thin film transistors are polysilicon thin film transistors.

14. The liquid crystal color projection display apparatus according to claim 1, wherein a device for diminishing scattered light is disposed in the optical projection system or between the optical projection system and the projection screen.

15. The liquid crystal color projection display apparatus according to claim 14, wherein the device for diminishing the scattered light is an aperture or a spot.

* * * * *